United States Patent [19]

Yamamoto

[11] 4,357,377
[45] Nov. 2, 1982

[54] THERMAL INSULATING AND BITUMINOUS WATERPROOFING BOARD AND APPLICATION PROCESS THEREOF

[75] Inventor: Kaname Yamamoto, Tokyo, Japan

[73] Assignee: Tajima Roofing Co., Ltd., Tokyo, Japan

[21] Appl. No.: 152,059

[22] Filed: May 20, 1980

[30] Foreign Application Priority Data

Jun. 1, 1979 [JP] Japan ................... 54-67427

[51] Int. Cl.$^3$ ...................... B32B 11/10; B32B 11/02
[52] U.S. Cl. ..................................... 428/40; 428/141; 428/143; 428/285; 428/291; 428/304.4; 428/311.5; 428/332; 428/920; 428/236; 428/251
[58] Field of Search ............... 428/141, 142, 268, 920, 428/291, 321, 489, 40, 285, 143, 332, 304.4, 311.5; 427/186; 156/337

[56] References Cited

U.S. PATENT DOCUMENTS

| | | | |
|---|---|---|---|
| 3,466,222 | 9/1969 | Curtis | 428/489 |
| 3,672,951 | 6/1972 | Moore et al. | 428/321 |
| 3,813,280 | 5/1974 | Olszyk et al. | 428/489 |
| 4,039,706 | 8/1977 | Tajima et al. | 428/141 |

FOREIGN PATENT DOCUMENTS

1517595 7/1978 United Kingdom ............... 428/489

*Primary Examiner*—Paul J. Thibodeau
*Attorney, Agent, or Firm*—Blanchard, Flynn, Thiel, Boutell & Tanis

[57] ABSTRACT

A new thermal insulating and bituminous waterproofing board suitable for use in the combined application process of thermal insulation and built-up roofing or waterproofing, as well as the application process thereof are provided. This thermal insulating and bituminous waterproofing board contains: (i) a modified bitumen layer containing, as a principal constituent, a mixture of bitumen and at least one inorganic filler, which layer is formed in the form of a thick board; (ii) a flat sheet laminated on each surface of the modified bitumen layer, said flat sheet consisting of a fibrous sheet, and; (iii) a thermal insulating material layer bonded, via the flat sheets, to one surface of the modified bitumen layer. This thermal insulating and bituminous waterproofing board can be easily and reliably applied onto a substrate without any complex procedures and, also, without causing any damage to the thermal insulating material.

14 Claims, 7 Drawing Figures

THERMAL INSULATING AND BITUMINOUS WATERPROOFING BOARD AND APPLICATION PROCESS THEREOF

The present invention relates to thermal insulating and bituminous waterproofing boards having both a thermal insulating function and a waterproofing function, which boards are suitable for, for example, simultaneously thermally insulating and waterproofing roofs of buildings. The present invention also relates to an application process of the thermal insulating and bituminous waterproofing boards. The terms "bitumen" and "bituminous" as used hereinbelow may be replaced by the term "asphalt".

In many cases, in order to improve the comfortableness of buildings and to prevent damage to buildings caused by changes in temperature, the roofs of buildings are covered with thermal insulating materials. Especially, since the saving of energy resources has been recently advocated in the world, the necessity of the thermal insulation of buildings has been strongly promoted due to the fact that the thermal insulation of buildings remarkably saves the energy used for the air-conditioning of buildings. Various kinds of thermal insulating materials, such as formed plastic boards and glass fiber boards, are now used for the thermal insulation of roofs. These thermal insulating materials are generally applied at the time a waterproofing layer is applied.

Heretofore, the application of thermal insulation to the roofs of buildings was carried out either by (a) first placing thermal insulating materials on the roof slabs and then forming a waterproofing layer over the thermal insulating materials or (b) first forming a waterproofing layer on the roof slabs and then placing thermal insulating materials over the waterproofing layer. However, it has been pointed out that these processes for applying thermal insulation and waterproofing are accompanied by the following problems.

(1) Thermal insulating materials have poor mechanical strengths, including compressive strength, impact strength, bending strength and the like, due to the fact that they have a structure in which a large amount of gas having a low heat conductivity is included. Therefore, not only when the thermal insulating materials are placed on either the roof slabs or the top surfaces of waterproofing layers, but also, when workers frequently walk on the top of the thermal insulating material layers on when the application tools and apparatus are moved or transferred on site, the applied thermal insulating materials are frequently damaged. Further, even when the workers walk on the tops of waterproofing layers which are applied over the thermal insulating material layers, and when the application tools and apparatus are moved or transferred on the tops of waterproofing layers, the thermal insulating materials under the waterproofing layer are liable to be deformed and damaged, and as a result, the waterproofing layer is also damaged. In addition, when a person walks on the tops of roofs where no cover sheet has been applied on waterproofing layers, the thermal insulating materials and the waterproofing layers mounted thereover are liable to be damaged.

(2) Although various kinds of processes for applying waterproofing onto the roofs of buildings have been utilized, bituminous waterproofing application processes are considered to be the most reliable and are most widely utilized at present. It is well known that, in accordance with these bituminous waterproofing application processes, continuous and integral waterproofing layers are formed over the entire surfaces of the roofs of buildings by spreading and overlapping several layers of roofing sheets over the roofs with molten bitumen. In order to protect the buildings from damage by rain for a long period, such as ten or more years, in accordance with the bituminous waterproofing application processes, it is necessary that the total thickness of the bituminous waterproofing layer be at least 10 mm in view of the chemical durability of bitumen. For obtaining such a thick bituminous waterproofing layer, several roofing sheets are generally spread and overlapped with each other over a substrate. This spreading and overlapping operation is very useful in the bituminous waterproofing application process in order to raise the waterproofing function. However, since this operation involves many steps and, further, the spreading step of the thermal insulating material is added in the case of the combined application process of thermal insulation and builtup waterproofing, the operation becomes troublesome.

In addition, since foamed thermoplastic materials, which are preferable thermal insulating materials, have a poor heat resistance, they have the serious problem of easily suffering fatal damage due to the heat of molten bitumen when the foamed thermoplastic materials are applied in combination which bituminous roofing or waterproofing.

Accordingly, the main objects of the present invention are to obviate the aforementioned problems associated with the conventional combined application processes of thermal insulation and builtup waterproofing and to provide novel thermal insulating and waterproofing boards which are capable of being easily applied to a substrate. and are capable of facilitating the combined application processes of thermal insulation and built-up waterproofing.

Another object of the present invention is to provide a novel combined application process of thermal insulation and built-up waterproofing.

In accordance with the present invention, there is provided a thermal insulating and bituminous waterproofing board comprising:

(i) a modified bitumen layer containing, as a principal constituent, a mixture of bitumen and at least one inorganic filler, which layer is formed in the form of a thick board;

(ii) a flat sheet laminated on each surface of the modified bitumen layer, said flat sheet consisting of a fibrous sheet, and;

(iii) a thermal insulating material layer bonded, through the flat sheet, to one surface of the modified bitumen layer.

In accordance with the present invention, there is also provided a combined application process for manufacturing a builtup bituminous roofing or waterproofing and thermal insulating assembly comprising the steps of;

(a) placing thermal insulating and bituminous waterproofing boards comprising (i) a modified bitumen layer containing, as a principal constituent, a mixture of bitumen and at least one inorganic filler and formed in the form of a thick board, (ii) a flat sheet laminated on each surface of the modified bitumen layer, said flat sheet consisting of a fibrous sheet, and (iii) a thermal insulating material layer bonded, through the flat sheet, to one surface of the modified bitumen layer, onto a substrate surface in such a manner that the thermal insulating layer of the board is in close adhering contact with the substrate surface;

(b) sealing the clearances between said boards with sealing material, and; then, (c) forming a continuous and integral waterproofing layer over the entire surface of the placed boards.

The present invention will now be explained in detail with reference to the accompanying drawings, illustrating the preferred embodiments of the present invention. However, the present invention is not limited to these preferred embodiments.

Figure 1:
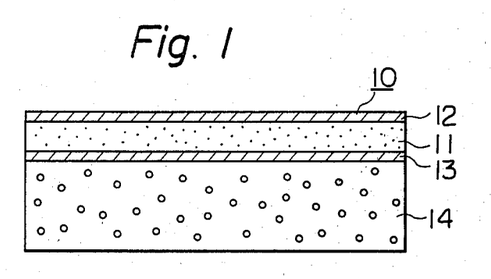
FIG. 1 is an explanatory cross-sectional view illustrating the basic structure of the board according to the present invention.

As illustrated in FIG. 1, the thermal insulating and bituminous waterproofing board 10 basically comprises: a modified bitumen layer 11 which is formed in the form of a relatively thick board from a bitumen mixture containing, as a principal constituent, a mixture of bitumen and an inorganic filler or fillers; flat sheets 12 and 13 laminated on both surfaces of the modified bitumen layer 11, and; a thermal insulating material layer 14 bonded to the flat sheet 13. The flat sheets 12 and 13 consist of a fibrous sheet.

Thus, the thermal insulating and bituminous waterproofing board according to the present invention comprises the modified bitumen layer having, on each surface thereof, the laminated flat sheet consisting of a fibrous sheet and the thermal insulating material layer. The modified bitumen layer is sometimes referred to as a bituminous waterproofing board hereinbelow. The bituminous waterproofing board has a function of preventing the underlying thermal insulating material from being destroyed and, also, serves as a waterproofing layer. Therefore, it is necessary that the material from which the bitumen waterproofing board is formed have high mechanical strengths, such as compressive strength, impact strength, bending strength and the like, and also, have a high waterproofing property. A board which is formed from only bitumen is not preferable, since stable high mechanical strengths cannot be obtained over a wide range of temperature. Surprisingly, the present invention has found that both good mechanical strengths and a high waterproofing property can be obtained in the case where a bitumen mixture mainly containing bitumen and an organic filler is formed into a relatively thick board.

The inorganic fillers which are incorporated into the bitumen mixture include, for example, conventional inorganic fillers in the form of powder, granules or flakes, such as calcium carbonate, clay, talc, aluminum hydroxide, mica, silica, graphite, carbon black and the like; mineral granules, such as fine and coarse sand, fine gravel, finely crushed stone and the like, and; inorganic fibers, such as asbestos, glass fibers, rock wool and the like. These inorganic fillers can be used alone or in any mixture thereof. The kinds and the porosity of the inorganic fillers to be used in the present invention are preferably selected from the aforementioned inorganic fillers in such a manner that a good filling of the fillers into the bitumen mixture can be obtained. Especially, fibrous inorganic fillers can be advantageously used together with the other inorganic fillers.

Although the amount of the inorganic filler to be incorporated into the bitumen mixture may be varied over a wide range, it is generally within the range of from about 20 to about 90% by weight, based on the total weight of the bitumen mixture. From the point of view of the mechanical strength, the waterproofing property and the processability, the amount of the inorganic filler to be incorporated into the bitumen mixture is preferably within the range of from 50 to 90% by weight, more preferably 70% or more, based on the total weight of the bitumen mixture. The most preferable composition of the bitumen mixture is as follows.

| Composition | % by weight |
|---|---|
| Blown bitumen | 25 |
| Asbestos | 20 |
| Talc | 22 |
| Calcium Carbonate | 33 |

Although organic fillers may be also used in the present invention, the use of organic fillers is not generally recommendable in view of their water resistance, the dimensional stability and the heat resistance.

The bitumen mixture used in the present invention can be prepared by uniformly mixing the inorganic filler(s) with molten bitumen in, for example, a ribbon blender, a kneader blender, a Banbury mixer, an extruder, a mixing roll and the like. Natural or synthetic rubbers can be optionally added in order to improve the low termperature properties of the bitumen. Other additives such as surface active agents can be also added to improve the dispersibility of the fillers. The bitumen mixture thus prepared can be easily formed in the form of a board by using, for example, heated rolls or an extruder. However, in order to further improve the processability as well as the mechanical strength and the dimensional stability of the product, flat sheets, essentially consisting of a fibrous material, are preferably laminated onto both surfaces of the bitumen mixture board (i.e. the modified bitumen layer) during the shaping step.

Figure 2:
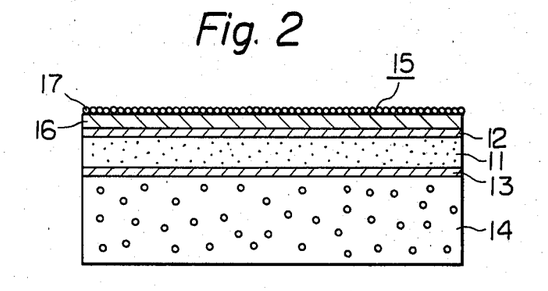
FIGS. 2 and 3 are explanatory cross-sectional views illustrating the structures of two preferred embodiments of the board according to the present invention.
Figure 3:
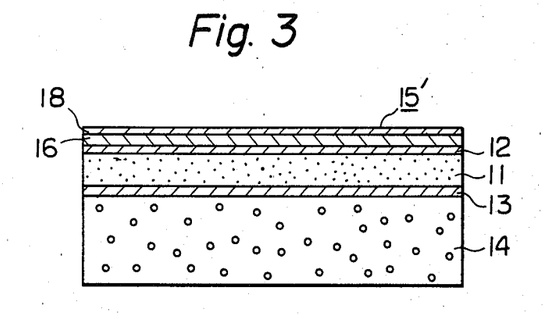

The fibrous sheets used in the present invention include, for example, woven or non-woven fabric made of glass fibers, asbestos fibers, various synthetic fibers and the like. Especially, non-woven fabric of glass fibers and glass mesh (woven fibric) are effective for improving the dimensional stability of the product. In the case where the bituminous waterproofing board is formed by using heated pressure rolls, two fibrous sheets are directly fed into the roll clearance in such a manner that the rolls are wrapped with the fibrous sheets, and then, the bitumen mixture containing bitumen and the inorganic filler(s) is fed and pressed between the fibrous sheets, to thereby form a bituminous waterproofing board comprising the bitumen mixture board having the laminated fibrous sheets on both surfaces thereof. On the other hand, in the case where the bituminous waterproofing board is formed by using an extruder, a flat sheet can be laminated onto each of the two surfaces of the extruded bitumen mixture in the form of a board by using press rolls immediately after the bitumen mixture is extruded. The weight of the fibrous sheet is preferably at least about 30 g/m² from the point of view of the processability and the properties of the product (e.g. dimensional stability, compression strength, impact strength and bending strength). Fibrous sheets which are previously impregnated with bitumen can be advantageously used. However, in the case where fibrous sheets, such as non-woven glass fabric, into which bitumen easily permeates are used, it is not necessary that the fibrous sheets be previously treated with bitumen. This is because the bitumen contained in the bitumen mixture permeates into the fibrous sheets when the fibrous sheets are laminated onto the bituminous waterproofing board between the rolls. In the case where the permeation of the bitumen into the fibrous sheets is insufficient or where a bitumen coated layer 16 is laminated on the flat sheet 12 on top of the modified bitumen layer 11, as illustrated in FIGS. 2 and 3, molten bitumen can be coated onto the flat sheets 12 and 13 or the flat sheet 12 by means of a roll coater, a knife coater, or the like, immediately after the above-mentioned pressure lamination step of the bituminous waterproofing board. Thus, the water resistance of the product can be further improved by the permeation of bitumen into the flat sheets 12 and 13.

Furthermore, in a thermal insulating and bituminous waterproofing board 15 or 15' as illustrated in FIGS. 2 and 3, when a bitumen or rubberized bitumen coated layer 16 is coated onto the top surface of the flat sheet 12 onto which the thermal insulating material 14 is not laminated, not only is the waterproofing property of the product increased, but also, the coated layer 16 can advantageously be a surface for forming a waterproofing layer because of the adhesion properties of the coated layer 16. The rubberized bitumen contains bitumen, rubbers and optionally, tackifiers, softners and the like. Although bitumen or rubberized bitumen may be coated onto the surface of the flat sheet 13 on which the thermal insulating material is laminated, generally, the insulating material layer can be advantageously adhered when the bitumen or rubberized bitumen layer is not placed on the surface of the flat sheet 13.

The rubberized bitumen is a bitumen which has been modified to impart high tackiness at an ambient temperature thereto by blending, mainly, natural or synthetic rubber and/or natural or synthetic resin into bitumen. The rubberized bitumen generally contains approximately 5 through 95% by weight of bitumen and approximately 5 through 95% by weight of rubber, and/or resin, and preferably, contains 20 through 90% by weight of bitumen and 10 through 80% by weight of rubber, and/or resin. In the case where the content of the bitumen is less than approximately 5% by weight, the affinity of the rubberized bitumen to, for example, a bituminous waterproofing membrane becomes unpreferably poor. Contrary to this, if the content of the rubber and/or resin is less than approximately 5% by weight, the flexibility and expandability of the rubberized bitumen at a low temperature becomes unpreferably poor.

The rubbers employed in the preparation of the rubberized bitumen include vulcanized or unvulcanized rubber or reclaimed rubber, for example, natural rubber, and synthetic rubber, such as styrene-butadiene rubber (SBR), acrylonitrile-butadiene rubber (NBR), chloroprene rubber (CR), butadiene rubber (BR), isoprene rubber (IR), butyl rubber ((IIR), ethylene-propylene rubber (EPR), ethylene-propylene diene mar (EPDM), polyisobutylene (PIB), styrene-butadiene-styrene block copolymer, styrene-isoprene-styrene block copolymer, chlorinated polyethylene, ethylene-vinyl acetate copolymer and the like. These rubbers can be used alone or in any mixture thereof.

The resins employed, alone or together with the rubber, in the preparation of the rubberized bitumen include, for example, natural resins, such as rosin or its derivatives (e.g. estergum), tall oil, cumarone-indene resin; synthetic resins, such as various petroleum resins or polyolefins (e.g. polybutene), and the like. These resins can be used alone or in any mixture thereof. If necessary, a portion of these rubber and/or resin components (up to 50% by weight) can be replaced by softeners, such as animal and vegetable oils and fats, mineral oils, and the like, to further increase the tackiness of the bitumen.

In order to prevent an unpreferable blocking phenomenon which can occur during production, storage and transportation of the board according to the present invention, the top surface of the bitumen or rubberized bitumen coated layer 16 can be preferably covered with a layer 17 of mineral granules, powder or flakes, such as calcium carbonate, clay, talc, mica, silica powder, and the like (see FIG. 2), or a plastic film or release sheet 18 (see FIG. 3), and the like. Especially when a waterproofing layer is applied onto the thermal insulating and bituminous waterproofing board according to the present invention by using a so-called cold application process (that is, an application process wherein a waterproofing layer is formed without using molten bitumen on an application site), it is preferable to laminate the bitumen or rubberized bitumen coated layer 16 on the flat sheet 12 and, then, to cover the layer 16 with the release sheet 18 is illustrated in FIG. 3. This is because, since the board can be easily applied, at the application site, upon the removal of the release sheet from the board, and since good adhesion properties can be obtained due to the presence of the bitumen or rubberized bitumen layer, the application process of the present invention is remarkably facilitated compared to the conventional processes.

The thickness of the bituminous waterproofing board may be varied over a wide range, but will generally be in the range of from 2 to 25 mm and, preferably, in the range of from 5 to 10 mm. The size of the bituminous waterproofing boards can be any size depending upon the purpose of their use. For example, they can be 1 m length×1 m width, 1 m length×0.5 m width, or the like.

The thermal insulating layer 14 is laminated on one surface of the bituminous waterproofing board. The thermal insulating layer 14 can be composed of any conventional thermal insulating materials. Examples of such thermal insulating materials are inorganic thermal insulating boards made of, for example, rock wools, slag wools, asbestos, glass fibers, calcium silicate, perlite, vermiculite, gypsum, foamed glasses and the like; foamed synthetic resins made of, for example, polystyrene, polyethylene, acrylic resin, phenol resin, urea resin, epoxy resin, diallylphthalate resin, urethane resin and the like; foamed rubbers, wood chip boards, wood wool boards and the like. The thickness of the thermal insulating material layer 14 may be varied over a wide range and is appropriately determined depending on the required heat transmission resistance.

In order to laminate the thermal insulating material layer 14 onto the bituminous waterproofing board, a bituminous waterproofing board and a thermal insulating board having the same size may be bonded to each other by using bitumen, rubberized bitumen, conventional adhesives and the like. However, from the point of view of the production of the thermal insulating and bituminous waterproofing board according to the present invention, preferable thermal insulating materials are those such as rigid polyurethane foam, which can be directly foamed on the surface of the bituminous waterproofing board to form a foamed layer. Thus, the bonding step of the bituminous waterproofing board and the thermal insulating board, and the use of adhesives, can be preferably obviated.

One example of the process of laminating a thermal insulating material layer of a rigid polyurethane foam onto a bituminous waterproofing board will now be explained with reference to FIG. 4.

Figure 4:
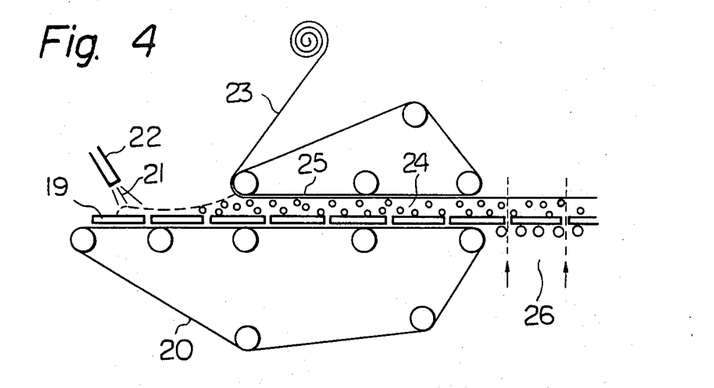
FIG. 4 is an explanatory schematic view illustrating the foaming process of the rigid polyurethane foam, when the rigid polyurethane form is used as a thermal insulating material of the board according to the present invention.

As illustrated in FIG. 4, the bituminuous waterproofing boards 19 which have been formed in a previous bituminous waterproofing board forming step (not shown) are placed on a conveyor belt 20 in such a manner that the surface thereof, into which a thermal insulating material layer is to be laminated, faces upwards. The surface on which a thermal insulating material layer is to be formed has no bitumen or rubberized bitumen coating. The boards 19 are transported on the conveyor belt 20. The bituminous waterproofing board 19 comprising the flat sheet 13 consisting essentially of the fibrous sheet is preferably impregnated, in the production step of the board 19, with bitumen in a semi-impregnated state sufficient to bond the modified bitumen layer 11 to the flat sheet 13. That is to say, the flat sheet 13 is preferably impregnated with bitumen in such a manner that the bitumen contained in the modified bitumen does not exude to the opposite surface of the flat sheet 13, but slightly permeates into the fibrous sheet. This is because, in the case where the bitumen exudes to the opposite surface of the flat sheet 13, the bonding of the polyurethane foam and the bituminous waterproofing board is likely to be adversely affected. The permeation extent of the bitumen can be easily controlled by, for example, the bitumen content of the modified bitumen, the working temperature, the pressure of pressure rolls and the like.

On the other hand, when thermal insulating materials which are formed in a separate step, such as foamed polystyrene resins, glass fiber boards, foamed glasses, and the like, are used, it is preferable that the flat sheet 13 be completely impregnated with bitumen, prior to the bonding of the bituminous waterproofing boards and the thermal insulating materials, to prevent the generation of air spaces in the flat sheet 13. This is because the presence of air spaces in the flat sheet 13 causes the permeation of water into the flat sheet 13 from the end thereof due to capillary action.

The bituminuous waterproofing boards 19 are previously cut into predetermined size and, then, transferred onto the conveyor belt 20. Onto the upper surface of the bituminous waterproofing board 19 placed on the belt conveyor 20, raw liquid material 21 for foaming rigid polyurethane foam, which is previously prepared, is coated through an appropriate nozzle 22. The raw liquid material 21 is covered with a flat sheet (e.g. a non-woven glass fabric) 23 which is guided by a belt conveyor 25 and, then, fed to a foaming step. Since bitumen does not exude onto the surface of the flat sheet of the bituminous waterproofing board 19, on which surface the raw liquid material 21 is to be coated, the urethane foaming liquid penetrates into the flat sheet and, thus, a very strong bond between the bituminous waterproofing board 19 and the foamed layer through the flat sheet 13 can be effected after the urethane is cured. It should be noted that any of the fibrous sheets exemplified above as a flat sheet for the bituminous waterproofing boards can be used as the abovementioned flat sheet for the foamed layer instead of the non-woven glass fabric. Although the use of the flat sheet for the foamed layer is not essential, this flat sheet can be preferably and advantageously used to give a good dimensional stability to the product. In order to improve the water resistance of the product and the bonding properties of the product to the application substrate, the flat sheet can be also impregnated with bitumen, atactic polypropylene and the like, or coated with rubberized bitumen. However, it is preferable that the surface of the flat sheet which is to be in contact with the urethane foaming liquid be in such a state that the urethane foaming liquid can easily permeate into the flat sheet.

The bituminous waterproofing board 19 having the urethane foaming liquid 21 and the non-woven glass fabric 23 thereon is fed to the foaming step and the foamed layer 24 is formed in a conventional manner. The thickness of the foamed layer 24 can be optionally controlled to any desired value by adjusting the clearance between the conveyor belts 20 and 25. The thermal insulating and bituminous waterproofing board thus produced is cut to the size of the bituminous waterproofing board 19 at a cutting step 26.

Although the manufacturing process of the thermal insulating and bituminous waterproofing boards, wherein foamed polyurethane is used as a thermal insulating layer, has been illustrated hereinabove, it should be noted that the bituminous waterproofing boards and any formed thermal insulating boards can be laminated with each other by using any conventional adhesives in a known manner.

Figure 5:
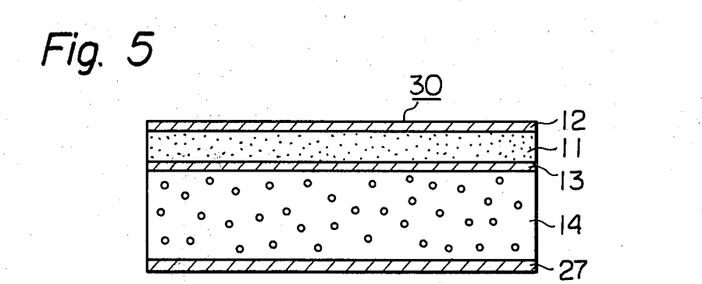
FIGS. 5 and 6 are explanatory cross-sectional views illustrating the structures of two other preferred embodiments of the board according to the present invention.
Figure 6:
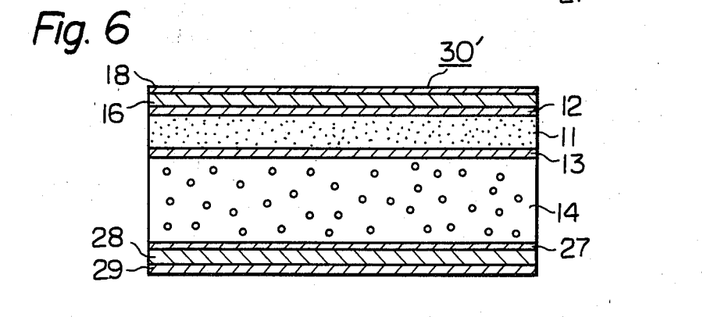

FIGS. 5 and 6 are cross-sectional views illustrating other embodiments 30 and 30' of the thermal insulating and waterproofing boards according to the present invention.

In the embodiment illustrated in FIG. 5, a flat sheet 27, comprising a fibrous sheet similar to the flat sheets 12 and 13, is laminated to the bottom surface of the thermal insulating layer 14. This flat sheet 27 improves the dimensional stability of the product and the bonding properties of the product to the substrate. Although only the flat sheet 12 is laminated on the top surface of the compound bitumen layer 11 in the board 30 illustrated in FIG. 5, the bitumen or rubberized bitumen coated layer 16 and the mineral granule layer 17 or the release sheet 18 can be laminated on or over the top surface of the compound bitumen layer 11, as illustrated in FIGS. 2 and 3.

In the thermal insulating and bituminous waterproofing board 30' illustrated in FIG. 6, a bitumen or rubberized bitumen coated layer 28 is laminated, via the flat sheet 27, on the bottom surface of the thermal insulating layer 14. This coated layer 28 enhances the water resistance and the moisture resistance of the product and improves the application properties of the product to the substrate. Any conventional release sheet 29 is laminated to the bottom surface of the coated layer 28, to thereby prevent the blocking of the product during the manufacturing process as well as during the storing and transferring stages. The release sheet 29 is removed from the coated layer 28 before the board 30' is used at construction site. In the embodiment illustrated in FIG. 6, one or both of the release sheets 18 and 29 may be replaced with the mineral granule or powder layer 17 illustrated in FIG. 2.

The combined application process for manufacturing a built-up bituminous waterproofing and thermal insulating assembly at a construction site according to the present invention will now be illustrated with reference to the accompanying FIG. 7.

Figure 7:
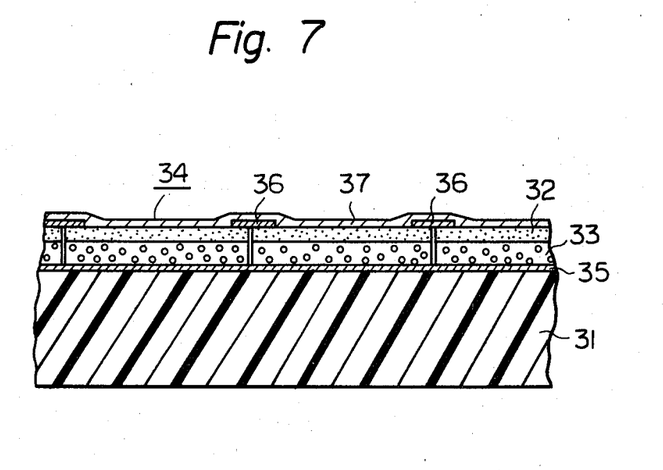
FIG. 7 is an explanatory schematic view illustrating the combined application process of the thermal insulation and built-up waterproofing according to the present invention.

As illustrated in FIG. 7, thermal insulating and bituminous waterproofing boards 34 of the present invention, which comprise integrally bonded bituminous waterproofing boards 32 and thermal insulating boards 33, are laid over a substrate 31. The boards 34 are bonded to the substrate 31 by an adhesive (the reference numeral 35 is an adhesive layer). Then, sealing materials 36 are applied onto the clearances between adjacent thermal insulating and bituminous waterproofing boards 34, whereby the clearances are sealed and, over the sealed boards, a waterproofing layer 37 is formed. The thermal insulating and waterproofing layer thus formed may optionally be covered with concrete.

Bituminous adhesives, such as molten bitumen, bituminous cement, rubberized bitumen and the like, can be advantageously used for bonding the thermal insulating and bituminous waterproofing boards 34 to the substrate 31. Although conventional solvent type or emulsion type adhesives made from synthetic rubbers and synthetic resins can be also used, depending upon the type of thermal insulating boards 33, it is preferable to use adhesives having an appropriate fluidity at an ordinary ambient temperature or less, which fluidity is similar to that of the bituminous adhesives. In the case where a board 30' having the self-adhesive coated layer 28 on the bottom of the thermal insulating boards 14, as illustrated in FIG. 6, is used, the board 30' can be easily bonded to the substrate by simply removing the release sheet 29 from the board 30' and then pressing the board 30' to the substrate.

The thermal insulating and bituminous waterproofing boards 34 can be applied onto a conventional moistureproof layer by using the above mentioned adhesives after the moistureproof layer is installed on the substrate. Particularly, there can be advantageously bonded to the substrate, a moistureproof layer of a self-adhesive sheet comprising: (i) a base sheet, such as a woven or non-woven fabric made from a synthetic fiber (e.g. polyester fiber, polyvinyl alcohol fiber, polyamide fiber or the like); (ii) rubberized bitumen coated layers on both sides of the base sheet, which are formed by coating the above-mentioned rubberized bitumen onto the both surfaces of the base sheet, and; (iii) release sheets, releasably laminated on the both coated layers. Accordingly, the thermal insulating and bituminous waterproofing board of the present invention can be preferably applied onto the moistureproof layer by utilizing the self-adhesive property of the self-adhesive sheet without using hot molten bitumen (i.e. a cold application process), and the formation of the moistureproof layer and the bonding of the thermal insulating and bituminous waterproofing board can be simultaneously effected.

After the application of the thermal insulating and bituminous waterproofing boards, the joint clearances between the adjacent boards are sealed by using the sealing materials 36. Non-shaped sealing materials and shaped sealing materials, such as sealing materials in the form of, for example, tape, string and the like, can be used, as the sealing material 36, alone or in any combination thereof. Preferable sealing materials which are used, as the sealing material 36, in the present application process are those which have a good adhesiveness to the thermal insulating and bituminous waterproofing board 34, and also, which have an appropriate fluidity, so that the sealing material 36 is not broken at the joints due to repeated stress which is derived from expansion and contraction of the boards themselves caused by increases and decreases of the ambient temperature. Any sealing materials which satisfy the two requirements mentioned above can be used in the application process of the present invention. Particularly, the above-mentioned rubberized bitumen type sealing materials can be preferably used in the present invention. Although the rubberized bitumen can be used in the non-shaped form, it is particularly advantageous to use rubberized bitumen type sealing materials in the form of tape which are prepared by: (i) coating the above-mentioned rubberized bitumen having a high self-adhesiveness, at a thickness of approximately 0.2 to 2 mm, on both surfaces of the base sheet, such as woven or non-woven fabric made from synthetic fibers, plastic films, rubber or plastic sheets; (ii) releasably laminating the release sheets on the surfaces of the coated rubberized bitumen layers; (iii) cutting the product thus obtained into tapes having a width of approximately 10 to 30 cm, and; (iv) rolling the tapes into a rolled product. When said sealing materials in the form of tape are used at the construction site, the rubberized bitumen sealing tape can be bonded to the joint portions of the boards 34 at an ordinary ambient temperature without using molten bitumen (i.e. a so-called cold application process), while the release sheets are removed from the sealing tape by manually peeling the release sheets therefrom. Thus, according to this embodiment of the present invention, the application operations at construction site can be performed under extremely high safety conditions, due to the facts that neither hot molten bitumen nor organic solvents are used at the construction site, and uniform sealing can be effected by the use of the pre-shaped sealing materials.

Particularly, in the conventional application processes, when a waterproofing layer is formed on the top surface of the substrates in the form of boards, the waterproofing layer at the joint portions of the substrates is likely to be locally broken at the joint portions due to fatigue of the substrates, which fatigue is the result of expansion and contraction of the substrates themselves caused by increases and decreases of temperature. Contrary to this, according to the present invention, since the sealing materials comprising the above-mentioned rubberized bitumen having an appropriate plastic fluidity even at an ordinary ambient temperature or less are used, a substantial portion of the external force which is derived from expansion and contraction of the thermal insulating and bituminous waterproofing boards at the joints portions thereof is absorbed into the sealing material (i.e. the rubberized bitumen). Thus, local breaks in the waterproofing layer can be effectively obviated.

Furthermore, there can be used as the sealing material 36, one-surface adhesive type sealing tapes comprising: (i) a base sheet, such as kraft paper and plastic sheet, only one surface of which is subjected to a releasing treatment by using, for example, silicone resins, fluorine resins or the like, in a conventional manner, and; (ii) a rubberized bitumen layer, having a thickness of approximately 0.2 to 2 mm, coated on the non-release surface of the base sheet. The one-surface adhesive type sealing tapes usually have a width of approximately 10 to 30 cm and are in the form of a roll. In the case where this sealing tape is used for sealing the joint portions of the adjacent thermal insulating and bituminous waterproofing board 34, the waterproofing layer 37 applied over the sealing tape 36 is not bonded to the sealing tape, due to the fact that the upper surface of the sealing tape is not subjected to the release treatment. Therefore, even when the expansion and contraction of the boards 34 occur at the joint portions thereof, the external force which is derived from such expansion and contraction can be not only relaxed by the cold flow of the rubberized bitumen of the sealing tape, but also, dispersed by the relative slide between the non-release surface of the sealing tape 36 and the waterproofing layer 37. Thus, breaks in the waterproofing layer 37, which is a serious problem in the conventional application process, can be completely obviated.

After sealing the joint portions between the thermal insulating and bituminous waterproofing boards 34 by the sealing materials 36, the waterproofing layer 37 is formed over the sealed boards 34. However, the bituminous waterproofing layers 32 of the boards 34 have a sufficient waterproofing property by themselves, and accordingly, even when the waterproofing layer 37 is not formed, sufficient thermal insulating and waterproofing properties are provided, so long as the joint portions of the boards are reliably sealed in the manner mentioned above. Nevertheless, in order to provide more stable and high waterproofing functions over a long period of time, it is preferable to form the waterproofing layer 37 over the sealed boards 34. In the case where the waterproofing layer 37 is not covered with, for example, concrete, a cap sheet is bonded to the uppermost layer to present a good appearance.

The waterproofing layer 37 can be formed by coating liquid or semi-solid waterproofing materials (i.e. so-called coating waterproof materials), or by laminating one or more roofing sheets on the substrate (i.e. the sealed boards 34). The roofing sheets include, for example, conventional bituminous roofing sheets, synthetic polymer roofing sheets made from, mainly, synthetic rubbers or synthetic resins and the like. These roofing sheets can be used in any combination thereof when plural layers are laminated. The use of the bituminous roofing sheets is most preferable.

The fabrication of the waterproofing layer can be carried out by either conventional hot application processes or conventional cold application processes. In the case where the first waterproofing layer is formed by a cold application process, the thermal insulating and bituminous waterproofing board having a bitumen or rubberized bitumen coated layer and a release sheet on the surface thereof, as illustrated in FIGS. 3 and 6, is used. The roofing sheet can be bonded to the bitumen or rubberized bitumen coated layer, while the release sheet is removed at the construction site. In the case of a hot application process, the thermal insulating and bituminous waterproofing board having a mineral granule or powder layer on the surface thereof, as illustrated in FIG. 2, can also be used.

Alternatively, the waterproofing layer can be formed by using a bituminous roofing sheet having, on the surface thereof, an approximately 1 to 3 mm width of a bitumen coated layer in the following manner. That is to say, while the bitumen coated layer is heated by means of any portable heating device, such as a burner, a torch lamp or a hot-air device, to thereby soften or melt the bitumen, the bitumen coated layer is bonded to the thermal insulating and bituminous waterproofing board. In this case, although a board having, on the surface thereof, the bitumen or rubberized bitumen coated layer covered with a release sheet, as illustrated in FIG. 3, can be advantageously used, a board having, on the surface thereof, a mineral granule or powder layer, or a mineral flake layer, as illustrated in FIG. 2, can be used. When the roofing sheet is bonded to the board, the top surface of the board can also be heated by means of said portable heating device, without causing any damage to the lower thermal insulating material.

The application of the roofing sheets over the surfaces of the thermal insulating and bituminous waterproofing board can be carried out according to any conventional roofing application process. However, the roofing sheets are preferably laid over the sealed boards in such a manner that the joint portions of the sealed boards and those of the first roofing layers do not overlap.

As described in detail above, according to the present invention, the following practical advantages are presented.

(1) Since the thermal insulating and bituminous waterproofing board of the present invention comprises the bituminous waterproofing board having high mechanical strengths, including compression strength, impact strength and bending strength, which board is laminated on the top surface of the thermal insulating layer, the damage problems due to breaks in the thermal insulating material in the prior art can be effectively obviated and, therefore, a complete thermal insulating and waterproofing layer can be obtained at a high operational efficiency and with a very low material loss.

(2) Since the above-mentioned bituminous waterproofing board has a high waterproofing property by itself, a thermal insulating and waterproofing layer having sufficient thermal insulating and waterproofing properties can be easily formed by applying only one roofing sheet onto the board, so long as the joint portions of the boards are reliably sealed. Thus, a remarkable labor-saving thermal insulating and waterproofing application process can be established, and a thermal insulating and waterproofing layer having more uniform thermal insulating and waterproofing properties than in the prior art can be safely obtained.

(3) Foamed materials, such as foamed polyethylene, foamed polystyrene and the like, which are readily available at a low cost but have a relatively low heat resistance, are difficult to use, as a thermal insulating material, in the case where a waterproofing layer is formed according to a hot application process. However, these thermal insulating materials can be used in the present application process, as mentioned above.

(4) Since the thermal insulating and waterproofing boards of the present invention are manufactured under well-controlled constant conditions at the factory, products having a constant quality can be produced, and a reliable thermal insulating and waterproofing layer can be easily obtained by simply laying the prefabricated boards, having a constant quality, over the substrate at the construction site. Thus, according to the present invention, the finish of the applied thermal insulating and waterproofing layer does not depend on the skill of the workers on site, whereas the finish largely depends on the skill of the workers in the conventional application processes.

(5) Since a large amount of the inorganic filler is contained in the thermal insulating and waterproofing board of the present invention, the amount of bitumen required for obtaining a waterproofing layer having the same waterproofing function as that of the conventional waterproofing layer can be remarkably reduced.

I claim:

1. A prefabricated thermal insulating and bituminous waterproofing board, consisting:
   a modified bitumen waterproofing layer in the form of a thick board having a thickness in the range of from about 2 to about 25 mm, said modified bitumen waterproofing layer consisting essentially of a uniform mixture of from 50 to 90 wt. % of pieces of inorganic filler and the balance is waterproofing roofing bitumen;
   first and second flat fibrous sheets respectively laminated on the opposite surfaces of said modified bitumen waterproofing layer, said flat fibrous sheets being woven or non-woven fabrics consisting essentially of glass fibers and having a weight of at least about 30 g/m², said waterproofing roofing bitumen being permeated into and partway through said flat fibrous sheets;
   a thermal insulating layer laminated on said first flat fibrous sheet, said thermal insulating layer consisting essentially of a rigid polyurethane foam which is directly foamed in situ on the surface of said first flat sheet and which penetrates thereinto so that said thermal insulating layer is strongly bonded to said first flat sheet and to said modified bitumen waterproofing layer.

2. A thermal insulating and bituminous waterproofing board as claimed in claim 1 including a second bitumen layer laminated on said second flat fibrous sheet, said second bitumen layer consisting essentially of from 20 to 90 wt. % of bitumen and from 10 to 80 wt. % of rubber, resin or mixture thereof effective to impart high tackiness to said second bitumen layer.

3. A thermal insulating and bituminous waterproofing board as claimed in claim 2 including a layer of mineral particles adhered to the top surface of said second bitumen layer.

4. A thermal insulating and bituminous waterproofing board as claimed in claim 2 including a release sheet covering the top surface of said second bitumen layer.

5. A thermal insulating and bituminous waterproofing board as claimed in claim 1 including a third flat fibrous sheet laminated to the surface of said thermal insulating layer opposite said first flat fibrous sheet.

6. A thermal insulating and bituminous waterproofing board as claimed in claim 5 including a third bitumen layer laminated on said third flat fibrous sheet, and a release sheet covering the bottom surface of said third bitumen layer.

7. A prefabricated, thermal insulating and bituminous waterproofing board, consisting essentially of:
   a thermal insulating layer having an upper surface and a lower surface, said thermal insulating layer being made of thermal insulating material;
   a first, flat, fibrous sheet having an upper surface and a lower surface, the lower surface of said first sheet being bonded to the upper surface of said thermal insulating layer in direct, face-to-face, mutually adhering contact;
   a modified bitumen layer in the form of a thick board having a thickness within the range of from 2 to 25 mm and having an upper surface and a lower surface, said modified bitumen layer consisting essentially of a uniform mixture of waterproofing bitumen and 50 to 90% by weight, based on the total weight of the mixture, of pieces of at least one inorganic filler, the lower surface of said modified bitumen layer being bonded to the upper surface of said first sheet in direct, face-to-face, mutually adhering contact; and
   a second, flat, fibrous sheet having an upper surface and a lower surface, the lower surface of said second sheet being bonded to the upper surface of said modified bitumen layer in direct, face-to-face, mutually adhering contact.

8. A board as claimed in claim 7, wherein said first and second sheets are non-woven glass fabrics.

9. A board as claimed in claim 7, wherein said first and second sheets are non-woven glass fabrics and said thermal insulating layer consists essentially of rigid polyurethane foam, said first sheet being impregnated with bitumen in such a manner that the bitumen does not exude to the lower surface thereof, whereby said rigid polyurethane foam is bonded through said lower surface of said first sheet to said modified bitumen layer.

10. A board as claimed in claim 7, wherein a bitumen or rubberized bitumen coating layer is coated onto said upper surface of said second flat sheet, and a release sheet is laminated on the upper surface of said coating layer.

11. A board as claimed in claim 7, wherein a bitumen or rubberized bitumen coating layer is coated onto said upper surface of said second flat sheet, and mineral granules, powder or flakes are deposited on the upper surface of said coating layer.

12. A board as claimed in claim 7, in which said modified bitumen layer has a thickness of from 5 to 10 mm and said inorganic filler is selected from the group consisting of calcium carbonate, clay, talc, aluminum hydroxide, mica, silica, graphite, carbon black, sand, fine gravel, crushed stone, asbestos, glass fibers, rock wool and mixtures thereof.

13. A board as claimed in claim 12, in which said thermal insulating layer is made of a material selected from the group consisting of rock wool, slag wool, asbestos, glass fiber, foamed glass, foamed polystyrene, foamed polyethylene, foamed acrylic resin, foamed phenol resin, foamed urea resin, foamed epoxy resin, foamed diallylphthalate resin, foamed polyurethane resin, foamed rubber and wood chipboard.

14. A board as claimed in claim 13 which has been prepared by shaping a composition in which said bitumen is molten to form said modified bitumen layer, laminating said first and second sheets by pressing same against the opposite surfaces of said modified bitumen layer, and then applying said thermal insulating layer onto said first sheet.

* * * * *

UNITED STATES PATENT AND TRADEMARK OFFICE
CERTIFICATE OF CORRECTION

PATENT NO. : 4 357 377
DATED : November 2, 1982
INVENTOR(S) : Kaname Yamamoto

It is certified that error appears in the above—identified patent and that said Letters Patent is hereby corrected as shown below:

Column 13, Line 18; after "consisting" insert
---essentially of---.

Signed and Sealed this

First Day of March 1983

[SEAL]

Attest:

GERALD J. MOSSINGHOFF

Attesting Officer
Commissioner of Patents and Trademarks